(12) United States Patent  (10) Patent No.: US 7,715,540 B1
Crespo et al.  (45) Date of Patent: May 11, 2010

(54) KEYBOARD CONTROLLED TELEPHONY FEATURES

(75) Inventors: Diego Crespo, Boston, MA (US); Raul I. Aldrey, Brookline, MA (US); Anil Guntupalli, Waltham, MA (US); Edwin Elberg, Woburn, MA (US); Bradford Jackvony, Reading, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1282 days.

(21) Appl. No.: 11/122,374

(22) Filed: May 5, 2005

(51) Int. Cl.
H04M 3/42 (2006.01)
(52) U.S. Cl. .............................. 379/201.05; 379/201.01
(58) Field of Classification Search ............ 379/201.01, 379/201.05, 142.01–142.18, 355.01–355.06; 455/554.2, 556.1
See application file for complete search history.

(56) References Cited

U.S. PATENT DOCUMENTS

| | | | |
|---|---|---|---|
| 4,540,850 A | 9/1985 | Herr et al. | |
| 5,327,486 A | 7/1994 | Wolff et al. | |
| 5,440,624 A | 8/1995 | Schoof | |
| 5,631,904 A | 5/1997 | Fitser et al. | |
| 5,652,789 A | 7/1997 | Miner et al. | |
| 5,724,412 A | 3/1998 | Srinivasan | |
| 5,872,841 A | 2/1999 | King et al. | |
| 5,875,242 A | 2/1999 | Glaser et al. | |
| 5,903,845 A | 5/1999 | Buhrmann et al. | |
| 5,907,547 A | 5/1999 | Foladare et al. | |
| 5,940,485 A * | 8/1999 | Sapra et al. ............ 379/142.15 |
| 6,084,584 A * | 7/2000 | Nahi et al. .................. 715/864 |
| 6,192,123 B1 | 2/2001 | Grunsted et al. | |
| 6,219,413 B1 | 4/2001 | Burg | |
| 6,226,374 B1 | 5/2001 | Howell et al. | |
| 6,256,020 B1 * | 7/2001 | Pabon et al. ................. 345/172 |
| 6,301,609 B1 | 10/2001 | Aravamudan et al. | |
| 6,310,947 B1 | 10/2001 | Polcyn | |
| 6,351,279 B1 | 2/2002 | Sawyer | |
| 6,371,484 B1 | 4/2002 | Yuan | |
| 6,411,605 B1 | 6/2002 | Vance et al. | |
| 6,430,289 B1 | 8/2002 | Liffick | |
| 6,442,245 B1 | 8/2002 | Castagna et al. | |
| 6,453,027 B1 * | 9/2002 | Kang et al. ............ 379/110.01 |
| 6,459,780 B1 | 10/2002 | Wurster et al. | |
| 6,463,145 B1 | 10/2002 | O'Neal et al. | |

(Continued)

FOREIGN PATENT DOCUMENTS

EP 0818908 A3 1/1998

(Continued)

OTHER PUBLICATIONS

"MP3 Recorder Download—MP3 Recorder—Record Audio Stream to MP3 or WAV," 2002, http://www.mp3-recorder.net.

(Continued)

Primary Examiner—William J Deane

(57) ABSTRACT

A system is described that includes a keyboard and a computing device running telecommunications management software in connection with a call control facility through wide area data network. The keyboard includes a plurality of dedicated telephone control input devices which correspond to an advanced telephony feature provided through the telecommunications management software. A device driver within the computing device allows operation of the dedicated telephone control input devices to be detected and associated functions of the telecommunications management software to be executed.

25 Claims, 5 Drawing Sheets

U.S. PATENT DOCUMENTS

| | | | |
|---|---|---|---|
| 6,470,079 B1 | 10/2002 | Benson | |
| 6,477,374 B1 | 11/2002 | Shaffer et al. | |
| 6,480,830 B1 | 11/2002 | Ford et al. | |
| 6,519,326 B1 | 2/2003 | Milewski et al. | |
| 6,535,596 B1 | 3/2003 | Frey et al. | |
| 6,535,931 B1* | 3/2003 | Celi, Jr. ...................... | 710/1 |
| 6,546,005 B1 | 4/2003 | Berkley et al. | |
| 6,563,914 B2 | 5/2003 | Sammon et al. | |
| 6,564,261 B1 | 5/2003 | Gudjonsson et al. | |
| 6,577,622 B1 | 6/2003 | Schuster et al. | |
| 6,584,122 B1 | 6/2003 | Matthews et al. | |
| 6,614,786 B1 | 9/2003 | Byers | |
| 6,625,258 B1 | 9/2003 | Ram et al. | |
| 6,717,938 B1 | 4/2004 | D'Angelo | |
| 6,735,292 B1 | 5/2004 | Johnson | |
| 6,757,372 B1* | 6/2004 | Dunlap et al. .......... | 379/142.17 |
| 6,771,949 B1 | 8/2004 | Corliss | |
| 6,980,641 B1* | 12/2005 | Stanford et al. ............. | 379/354 |
| 2001/0003202 A1 | 6/2001 | Mache et al. | |
| 2001/0014863 A1 | 8/2001 | Williams, III | |
| 2002/0012425 A1 | 1/2002 | Brisebois et al. | |
| 2002/0055351 A1 | 5/2002 | Elsey et al. | |
| 2002/0076026 A1 | 6/2002 | Batten | |
| 2002/0076027 A1 | 6/2002 | Bernnan et al. | |
| 2002/0077082 A1 | 6/2002 | Cruickshank | |
| 2002/0080942 A1 | 6/2002 | Clapper | |
| 2002/0083462 A1 | 6/2002 | Arnott | |
| 2002/0110121 A1 | 8/2002 | Mishra | |
| 2002/0147777 A1 | 10/2002 | Hackbarth et al. | |
| 2002/0147811 A1 | 10/2002 | Schwartz et al. | |
| 2002/0181674 A1* | 12/2002 | Cannell et al. ........... | 379/93.01 |
| 2003/0014488 A1 | 1/2003 | Dalal et al. | |
| 2003/0058838 A1 | 3/2003 | Wengrovitz | |
| 2003/0169330 A1 | 9/2003 | Ben-Shachar et al. | |
| 2004/0019638 A1 | 1/2004 | Makagon et al. | |
| 2004/0034700 A1 | 2/2004 | Polcyn | |
| 2004/0044658 A1 | 3/2004 | Crabtree et al. | |
| 2004/0249884 A1 | 12/2004 | Caspi et al. | |
| 2007/0049355 A1* | 3/2007 | Wu ......................... | 455/575.1 |

FOREIGN PATENT DOCUMENTS

| | | |
|---|---|---|
| JP | 59-169264 | 9/1984 |
| JP | 2000-270307 | 9/2000 |
| WO | WO 01/11586 A1 | 2/2001 |

OTHER PUBLICATIONS

"FAQ Premium Home Answer" eVoice, http://content.evoice.com/wcs/signUp/FAQ_premHA_s01.htm.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration," VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

Business Solutions/Professional, http://www.accessline.com/business_sol/bs_professional_body.html.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, 2003-4.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/ www.dataconnection.com/messging/vnfeat.htm.

Data Connection, Strategic Software Technology, "DC-VoiceNet," Data Connection Ltd. 1998-2000, http://www.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

* cited by examiner

KEYBOARD CONTROLLED TELEPHONY FEATURES

BACKGROUND

Sophisticated telephone systems, such as those used in large businesses, commonly include "advanced" features, such as call waiting, caller ID, conference call, call forwarding, transfer call, and/or voicemail messaging. A number of these features are not available on conventional public switched telephone network ("PSTN") telephone systems that are normally used in residential and small/medium-sized businesses (e.g., Plain Old Telephone Service—POTS). A commercially-available telecommunication management software package, such as the IOBI™ product available from Verizon, enables conventional PSTN telephones to have the various advanced telephone features otherwise available only on sophisticated telephone systems. The telecommunication management software package typically provides client software that runs on personal computers and communicates over a wide area network, such as the Internet, to facilities deployed by a telecommunications service provider.

When a call is made to a subscriber's telephone number, a notice is sent from the facilities of the service provider to the subscriber's personal computer furnished with the telecommunications management software. The telecommunications management software notifies the subscriber that a call is being requested and allows the subscriber to handle the call by selecting a control feature from a menu of advanced telephone control features supported by the telecommunications management software. The user performs such selection by using the general selection facilities of the computer—typically a mouse, but also general "navigation" keys (such as arrow keys)—to navigate a menu system, highlight and select a menu entry corresponding to the advanced telephone control feature desired.

Although the telecommunication management software provides for access to advanced telephone control features that may not be available on conventional PSTN telephone systems, having to use the computer mouse, or arrow keys, to navigate through the menu options before selecting a desired control feature requires that the user perform a number of steps, e.g., scrolling, pointing, clicking. It is understood that business owners are concerned about being able to understand and address the needs of potential clients as quickly and efficiently as possible to maintain a competitive edge in their respective markets, and that the time required to make a call control selection using the general navigation facilities of a computer may be too long for certain callers. Furthermore, users of the telecommunications management system may require training to be able to quickly navigate the menu system, resulting in lost productivity and inflexibility in personnel staffing. Therefore, it is appreciated that an advantage can be realized from a system and method that allows for business personnel, or consumers, using telecommunication management software as described above to save more time with regard to handling and disposing of incoming calls.

BRIEF DESCRIPTION OF THE DRAWINGS

The accompanying drawings illustrate various embodiments of the present invention and are a part of the specification. The illustrated embodiments are merely examples of the invention and do not limit the scope of the invention. Throughout the drawings, identical reference numbers designate identical or similar elements.

DETAILED DESCRIPTION OF PREFERRED EMBODIMENTS

Figure 1:
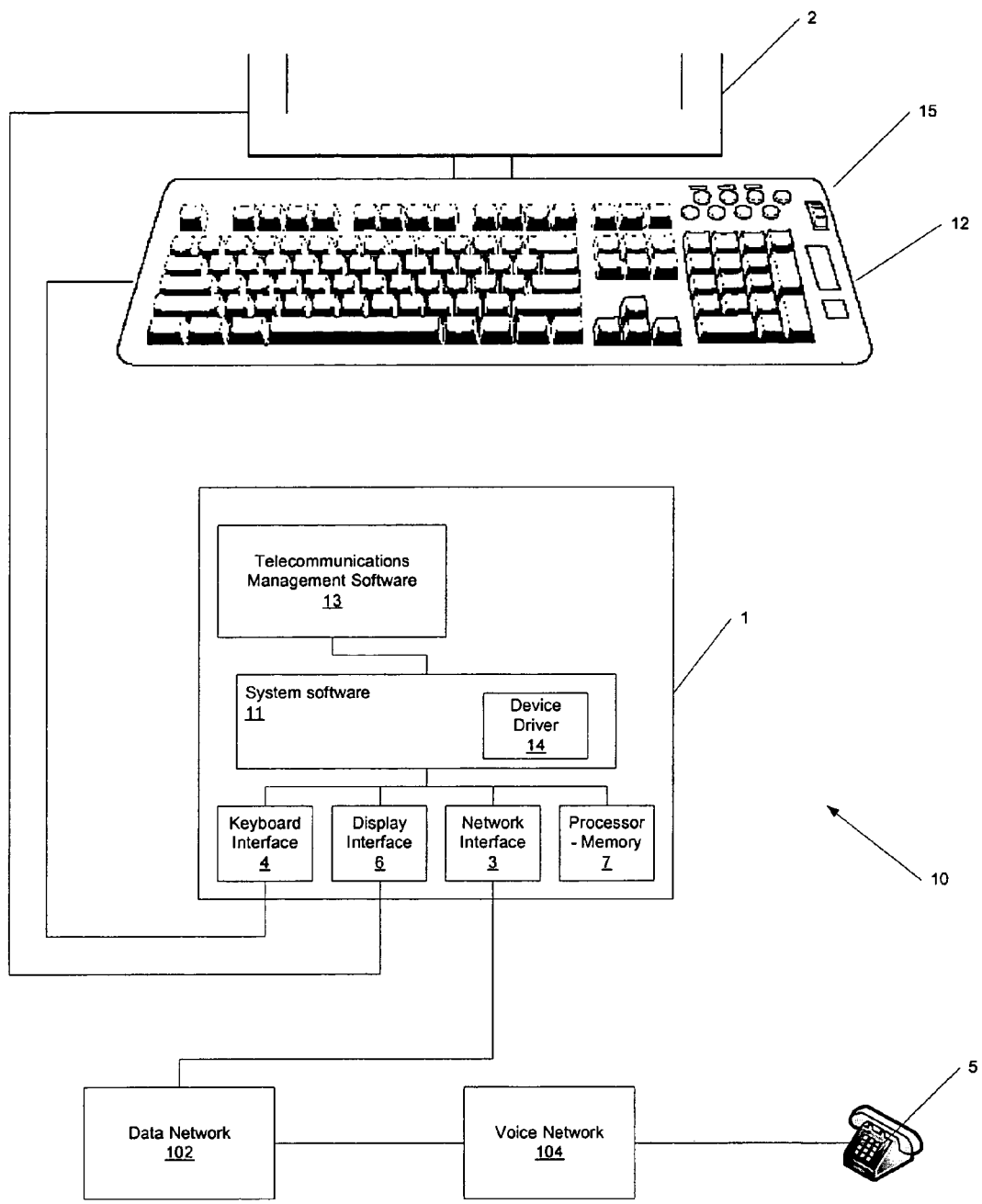
FIG. 1 is a perspective and partially schematic view of an embodiment of a computer keyboard system implemented according to the present invention.

Embodiments of the invention relate to a computer keyboard system adapted to cooperate with a computing device in communication with call control facilities deployed by a service provider and linked to the PSTN via a wide area packet-switched data network (such as the Internet) to provide for activation and control of a number of "advanced" telephone features. Communication between the packet-switched network and the PSTN is supported by a call control facility in a fashion known to those skilled in the art (for example, as described in U.S. patent application Ser. No. 10/083,792, which is incorporated herein by reference). The system may be used with telephone systems that are unequipped with controls for advanced telephone features, as well as telephone systems that include controls for such advanced telephone features. More particularly, the system is adapted to provide quick access to advanced telephone features via a computer keyboard and a computing device such that navigation of a menu system of a telecommunications management program is not required to access such advanced telephone features, and a telephone is not needed for the functionality of the system (except as a means to communicate over a voice communication network).

In the preferred embodiment, incoming calls over the PSTN to a particular telephone number are monitored by the service provider (in this example, via the call control facility). The number, or numbers, monitored is designated by the user (which may be a subscriber to the service provider). The service provider notifies the user when a call is being made to the designated telephone number via, for example, an alert message sent over the packet-switched network from the call control facility to telecommunications management software executing on a designated computing device of the user. The user then uses the computer keyboard system to process the call using an advanced telephone feature—e.g., forwarding the call to another number or sending the call to voice-mail. The computer keyboard system provides certain dedicated input devices (e.g., pushbuttons) that have been associated with certain advanced telephone features provided by the telecommunications management software. The user can then use the input device associated with the advanced telephone service the user desires to apply to the call to initiate such advanced telephone service by the telecommunications management software, without the need to navigate the menus of the software.

As an example, if the user is traveling away from home or office, the user may want to forward incoming telephone calls to a cellular phone number or directly to voice mail. When an alert is received at the user's computing device, the user may use the computer keyboard system—and specifically, the dedicated input devices therein—to allow the user to redirect calls to his or her cellular telephone number, some other telephone number, or to voice-mail in a quick and easy manner. The selected input device causes the telecommunications management software to send an instruction to the call control facilities of the service provider to re-route the call from the designated telephone number to (in this example) the user's cellular telephone number or voicemail accordingly.

The system affords small and medium businesses, as well as consumers, an efficient and convenient means of accessing and controlling telephone features using a computing device and keyboard. The computer keyboard system not only allows for small and medium-sized business owners to realize a cost savings by not having to purchase advanced telephone systems equipped with controls for advanced telephone features, the system permits an individual using a computing device to quickly access and control telephone features through the computing device and keyboard with a minimum of advance training, thus saving time and increasing productivity.

Figure 5:
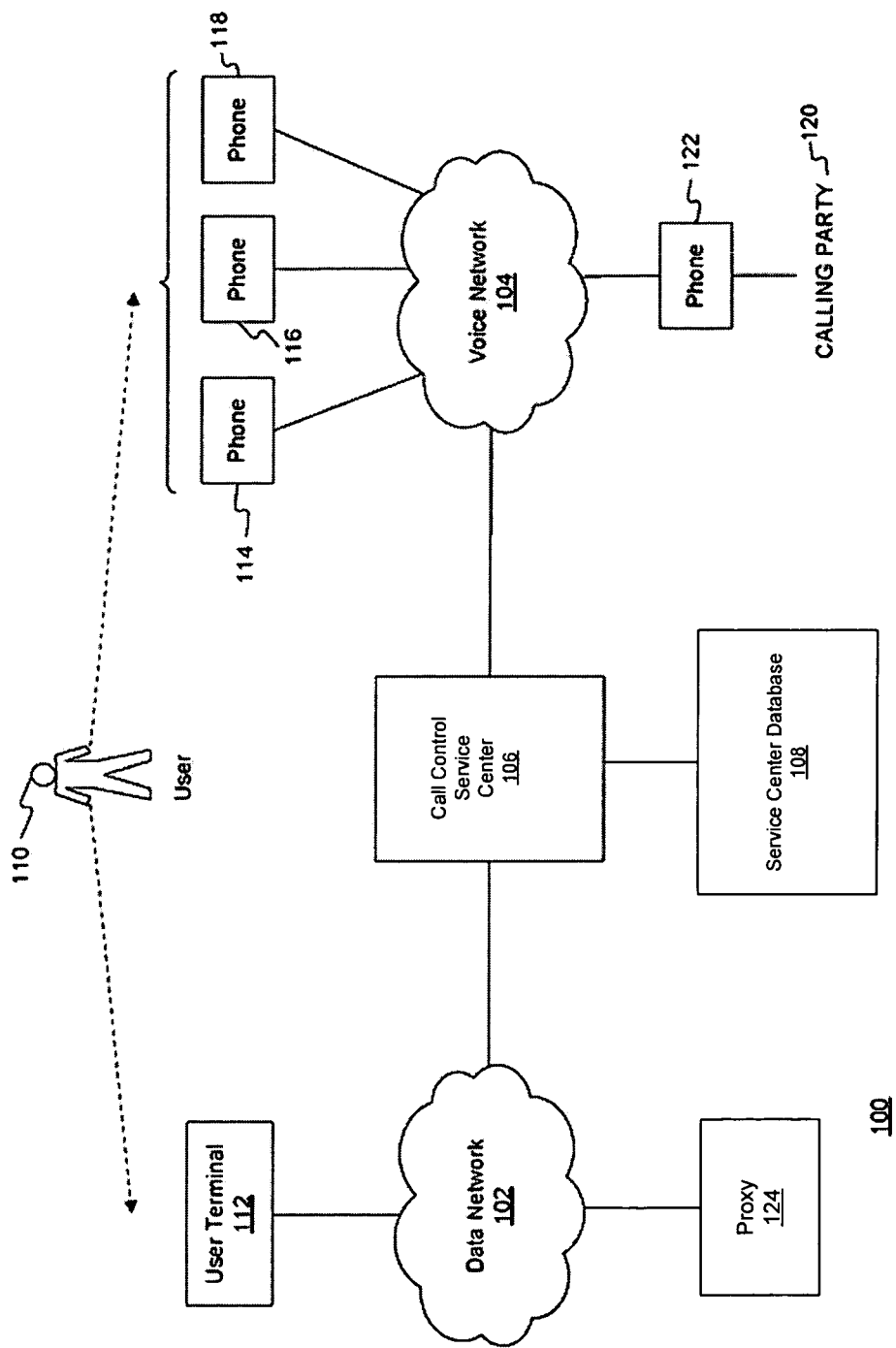
FIG. 5 is a block diagram of a data processing and telecommunications environment which may be used in connection with the exemplary computer keyboard system.

FIG. 5 is a block diagram of an exemplary data processing and telecommunications environment in which the preferred keyboard and computing device implemented according to the present invention may be used. The data processing and telecommunications environment 100 may include a data network 102, a voice network 104, a call control service center facility 106, and a service center database 108. As shown, a user/subscriber 110 may use a user computing device 112 to interface with data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 5, such as user computing device 112 and call control service center 106. Data network 102 may be a shared, public, or private network and encompass a wide area or local area. For example, data network 102 may be implemented as a packet-switched network, which may employ the Internet Protocol ("IP") protocol suite, such as the Internet. Data network 102 may be implemented as a wireline network, a wireless network, or a combination of both.

Voice network 104 provides telephony services, for example, to allow calling party 120 to place a telephone call to user 110. For example, voice network 104 may be implemented using a network such as the PSTN. Voice network 104 may be completely or partially implemented using VoIP technology. Voice network may be implement as a wireline network, a wireless network, or a combination of both.

Call control service center 106 provides a platform for managing communications over data network 102 and voice network 104. In addition, call control service center 106 provides gateway functions, such as code and protocol conversions, to transfer communications between data network 102 and voice network 104. Call control service center 106 may be implemented using a combination of hardware and software. For example, call control service center 106 may be implemented using a plurality of a general purpose computers or servers intercoupled by a network (not shown). Although call control service center 106 is shown with direct connections to data network 102 and voice network 104, any number and type of network elements may be interposed between call control service center 106, data network 102, and voice network 104.

Service center database 108 is used to store information regarding user 110. For example, service center database 108 may contain information including: an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications are forwarded, such as telephone calls over voice network 104. Service center database 108 may be implemented as an ORACLE database using a combination of known hardware and software, such as PROLIANT servers and EMC storage devices.

User computing device 112 provides user 110 an interface to data network 102. For example, user computing device 112 may be implemented using any device capable of accessing the Internet, such as a general purpose computer or personal computer equipped with a modem or other network interface. Furthermore, user computing device 112 may be implemented in wireless devices, such as pagers, mobile phones (with data access functions), and Personal Digital Assistants ("PDA") with network connections, such as the BLACK-BERRY device from Research-In-Motion, or the TREO device from Palm.

User computing device 112 also allows user 110 to communicate with call control service center 106. For example, user 110 may use instant messaging ("IM") to communicate with call control service center 106, for example, as described in RFC 2778, M. Day et al., The Internet Society (2000), titled "A Model for Presence and Instant Messaging," which describes, among other things, a model for providing instant messaging services. There are several known IM systems including America Online Instant Messenger ("AIM") and Microsoft Network Messenger Service ("MSNMS"). In addition to IM, user computing device 112 may use other protocols, applications or services available over the IP protocol suite, including the hypertext transfer protocol ("HTTP"), the user datagram protocol ("UDP"), the file transfer protocol ("FTP"), the hypertext markup language ("HTML"), the session initiation protocol ("SIP") and the extensible markup language ("XML").

User computing device 112 may communicate directly with call control service center 106 over data network 102. For example, a client application may be installed on user computing device 112, which directly communicates with call control service center 106. Alternatively, user computing device 112 may communicate with call control service center 106 via proxy 124, which may act on behalf of user 110 to interface with call control service center 106 and provides functions, such as authentication services, and protocol translation services. For example, user 110 may be a MSNMS subscriber and proxy 124 may be a MSNMS server. User 110 may then use MSNMS IM services to indirectly interface with call control service center 106. As another example, proxy 124 may include a web site. User 110 may provide information, such as information for call forwarding patterns, to proxy 124 via web pages provided by proxy 124 and secured using secured sockets layer ("SSL") or other security technology. Proxy 124 may then establish a secure session with call control service center 106 and provide the information from user 110.

Phones 114, 116, 118, and 122 interface with voice network 104. Phones 114, 116, 118, and 122 may be implemented using known devices, including wireline phones, and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

A system implementing the preferred embodiment according to the present invention is illustrated in FIG. 1. As shown in FIG. 1, the exemplary system 10 is implemented using a computing device 1 having a display 2, a network interface 3 which places the computing device in communication with data network 102, and a keyboard 12. System 10 may be used with a telephone 5 which, in this instance, is unequipped with controls for advanced telephone features. Telephone 5 is in communication with voice network 104 (e.g., the PSTN). Although FIG. 1 illustrates the system 10 being used with a telephone 5 that is unequipped with controls for advanced telephone features, the system 10 may be adapted for use with advanced telephone systems that include controls for advanced telephone features (not shown). The system 10 may also be used with "Voice over IP" (VoIP) systems that provide voice telephony via telephone 5. As mentioned above, the exemplary system 10 does not require a telephone for system functionality but a telephone is needed as a means to communicate over the voice communication network 104. The system 10 uses the data network 102 to communicate with the call control service center facility 106 to monitor calls to a particular telephone number (or perhaps a particular network address in the case of VoIP) in the voice network 104, such that the calls can be handled using the advanced telephone control features of the exemplary system.

The user (not shown) is typically a human being able to utilize the exemplary system 10 for accessing and controlling advanced telephone features by means of the computing device 1 and the keyboard 12. However, the user may be an automated agent or some other form of intelligent technology configured to provide input to the system 10.

The computing device 1 may be a conventional computer system or computing device including, for example, desktop computers, laptop computers, handheld computers or the like having a processor system—memory system 7, a display 2 and display interface 6, a network interface 3 for connection to data network 102, and a keyboard interface 4 (which may be implement using for example a Universal Serial Bus (USB) port or a wireless link) for connection with keyboard 12. The computing device may contain system software 11 (such as an operating system) to manage communications between the various interfaces and other software executing on computing device 1. Such software may include telecommunications management software 13 that is known by those in the art to provide access to advanced telephone features through the computing device 1. One example of telecommunications management software is the commercially-available IOBI client available from Verizon. The computing device 1 is placed in communication with the data network 102 via the network interface 3. The network interface may comprise a POTS telephone modem, Digital Subscriber Line (DSL) modem, cable modem, Ethernet NIC, wireless link or other means known to those skilled in the art. The computing device 1 communicates with the voice communication network 104, e.g., the PSTN, via the data network 102 and the call control facilities 106 of the telecommunications service provider.

The exemplary system 10 is in communication with a voice communication network 104, e.g., the PSTN, via the data network 102. The expression "PSTN" commonly refers to the standard telephone network accessible by most homes and small businesses. Currently, the PSTN provides a switching scheme that allows two parties to be connected through a time-division multiplexed (TDM) circuit-switched network for conducting communications. For example, after a first party dials a second party's number using the PSTN, the call is routed through a switch at a service provider of the first party to a switch of the service provider of the second party (if the service providers are the same, the two parties may be served by the same switch). A connection is made between the first party's telephone and the second party's telephone using their respective assigned switches and possibly several interconnected switches in between. A dedicated line or circuit is created between the two telephones for the duration of the connection. It is appreciated that the current PSTN operation is merely exemplary of a voice communication network in which embodiments of the computer keyboard system has utility. The system may be used with non-PSTN voice communication networks or PSTN voice networks that implement alternative switching protocols and technologies, such as packet-switched protocols such as VoIP.

Referring again to FIG. 1, the telephone 5 is placed in communication with the PSTN in a known manner (for example, via a twisted pair copper loop). The computing device 1 is placed in communication with the data network 102 via the network interface 3, and may interface with call control facilities 106 that interact with the PSTN via the data network 102. The telephone 5 illustrated in FIG. 1 is unequipped with controls for advanced telephone features, however, it is appreciated that the system 10 may be used with advanced telephone systems having controls for advanced telephone features including PBX and IP telephony systems (although such systems might not include all of the features provided by system 10). Further, the system 10 does not require a telephone 5 for functionality. The system 10 relies on the data network 102 to communicate with the voice communication network 104 via the call control facility 106. Thus, the system can function properly from any location where access to the data network 102 can be obtained.

The computing device 1 includes telecommunications management software 13 adapted to provide access to advanced telephone features through the computing device 1. Telecommunications management software 13 allows users to manage telephone calls through a number of features such as (for example) call notification, voicemail, call forwarding, call logging, address book, and busy call management, which can (for example) redirect a call to voicemail when a user is currently on an active call.

The exemplary system 10 includes a keyboard 12 having a plurality of input devices, such as pushbuttons, wherein a portion of the input devices are dedicated telephone control input devices 15 operable to allow advanced telephone features to be accessed and controlled by means of the keyboard 12. Each of the dedicated telephone control input devices 15 is operable to activate at least one advanced telephone feature, as will be described in further detail below. Although not shown in the figures, the keyboard 12 may be provided with an ergonomic look and feel to be esthetically pleasing as well as comfortable to use.

The system 10 also includes a device driver 14 within the computing device 1 (and may further be implemented in conjunction with system software 11) to allow functions or features of the telecommunications management software 13 to be accessible by operating the dedicated telephone control input devices 15 on the keyboard 12. In effect, the device driver 14 "maps" each of the dedicated telephony control input devices 15 on the keyboard 12 to software-based functions supported by the telecommunications management software 13. This mapping may take the form of assignment of key codes associated with (and unique to) each of the dedicated telephone control input devices 15 to access points for accessing specific associated functionality of the telecommunications management software 13. This device driver may take the form of input device drivers as commonly known in the art (particularly in the case of keyboard device drivers).

Figure 2:
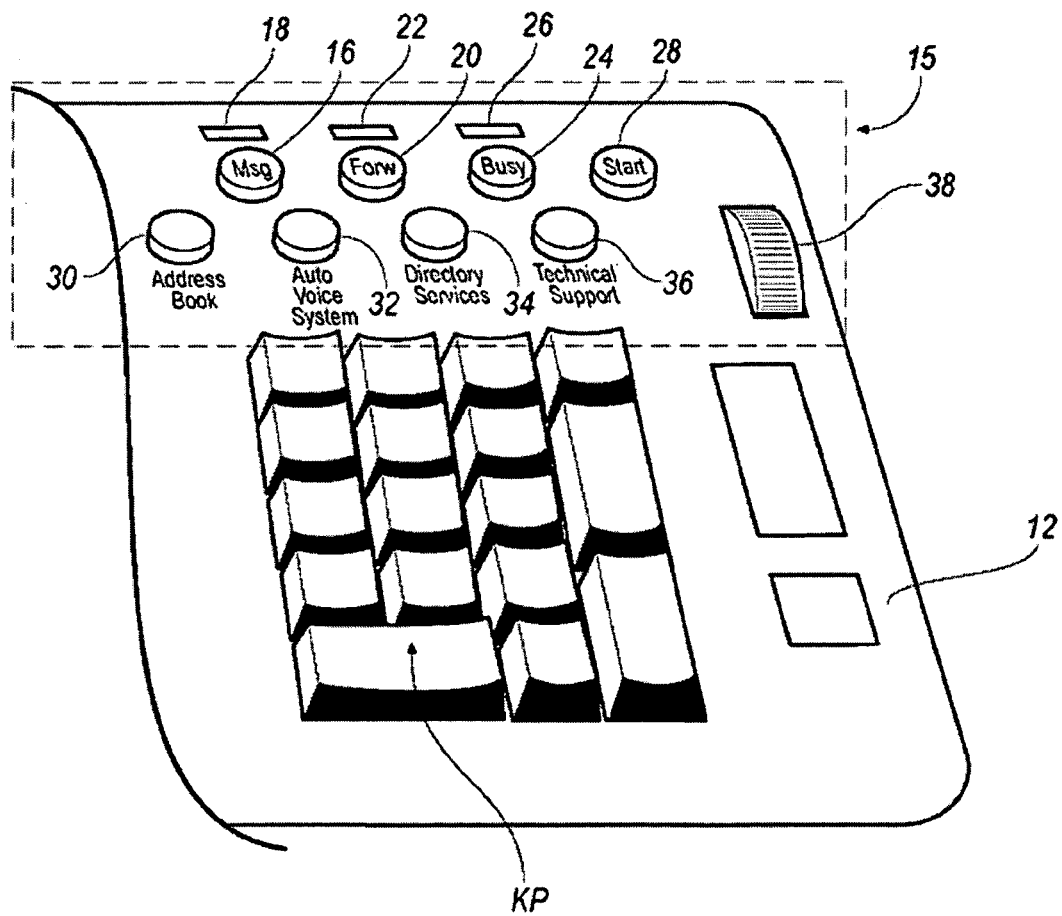
FIG. 2 is an enlarged fragmentary view of the computer keyboard system of FIG. 1.

Referring now to FIG. 2, an enlarged portion of the keyboard 12 illustrates some exemplary dedicated telephone control input devices 15 in detail. Those of skill in the art will recognize others may be possible, consistent with the descriptions provided herein. As shown in FIG. 2, a "voicemail" button 16 is provided as one of the dedicated telephone control input devices 15. This button 16 is provided with the label "voicemail" or "msgs" (or possibly some other label) indicating its association with a function (provided by the telecommunications management software 13) that allows the user to access his or her voicemail account. Thus, by pressing (or depressing) the voicemail button 16, the system 10 is operable to access the user's voicemail account, for example, in order to listen to stored voicemails. In the preferred embodiment, the software 13 opens a navigation window (not shown) on the display 2 to allow the user to play, skip, rewind, erase and perform other navigation functions for stored voicemail. Also, the user may use the back and forward arrows on the keyboard 12 to skip messages as desired. If the user presses the "delete" key on the keyboard 12 while a message is being played, then the message will automatically be deleted and the system 10 will be advanced to play the next voice message, if any.

The keyboard 12 preferably includes an indicator light 18 positioned proximate to the voicemail button 16 for indicating to the user that new voicemails are available to be played. Preferably the indicator light 18 is a red light-emitting diode (LED) that becomes illuminated (or flashes) when new voicemails are available. It is appreciated, however, that other types of light sources and colors may be used without exceeding the scope of the invention. Indicator light 18 may be associated with one or mores code (unique among codes associated with keyboard 12), which allows its state to be set via the device driver 14. For example, upon notification that a voicemail has been received, software 13 provide notification to device driver 14, which then transmits a code associated with indicator light 18 to the keyboard 12. Keyboard 12 may then set the state of indicator light 18 (e.g., on, off, blinking, etc.) based on the received code.

Exemplary keyboard 12 also includes a "call-forwarding" button 20 as one of the dedicated telephone control input devices 15. Call forwarding button may be provided with the label "forward" or "forw" (for example) indicating its association with the function (provided through the telecommunications management software 13) of forwarding incoming calls to a designated number. Thus, by pressing (or depressing) button 20, the system 10 is operable to have calls forwarded to a designated number stored, for example, in the user's profile. The designated number may be that of the user's home telephone, cell telephone, or other telephone as desired by the user. In response to selection of the button 20, telecommunications management software 13 will communicate with call control facilities 106 to cause call forwarding to be implemented to the designated number, in a fashion known to those skilled in the art.

Preferably, an indicator light 22 is disposed proximate to the call forwarding button 20 for indicating that the call forwarding feature is active. The indicator light 22 is preferably a green LED that remains lit when call forwarding is active. Other types of light sources and colors may be used, however, without exceeding the scope of the invention. Operation of the indicator light 22 may be similar to that of indicator light 18 (which may have its own unique associated codes).

Still referring to FIG. 2, the keyboard 12 may also include a "busy" button 24 as part of the dedicated telephone control input devices 15. Button 24 may include the label "busy" or other label that indicates its association with the function (provided by telecommunications management software 13) to redirect an incoming call to voicemail or forward the call to a number of choice, as desired by the user when the user is on another call. For example, the system 10 can be configured to cause calls to be sent to the number of a personal assistant when the user is on a call, when the user has activated the busy redirection function using the button 24. Preferably, the busy button 24 has an indicator light 26 proximate thereto for indicating that the busy redirection function is active. Most preferably, the indicator light 26 is a red LED, however, other light sources and colors may be used.

The preferred keyboard 12 may also include a "start" button 28 as part of the dedicated telephone control input devices 15. Button 28 may include the label "start" or other label that indicates its association with the function (provided by the telecommunications management software 13) to enable access to certain features through the keyboard 12. Button 28 may be implemented such that sensing an extended depression of button 28 (for example, a range between 1 and 3 seconds) enables the use of the dedicated telephone control input devices 15. The start button 28 may also be used in combination with the standard numeric pushbuttons provided by keyboard 12 for speed-dialing preset telephone numbers. For example, pressing the start button 28 and the number 1 on a numeric keypad KP will retrieve a number stored by the telecommunications management software 13 associated with the number 1 and automatically dial the number. Similarly, the other numbers on the numeric keypad KP may be used singularly, or in combination, to retrieve and dial other stored numbers as desired. It is appreciated that other pushbuttons of the keyboard 12 may be used with the start button 28 to perform this function.

The preferred keyboard 12 may also include an "address book" button 30 as part of the dedicated telephone control input devices 15. Button 30 may include the label "address book" or "addr" or some other label that indicates its association with the function (provided by the telecommunications management software 13) of providing an address book to store contact information. By pressing the address book button 30, the software 13 may open a search window (not shown) on the display 2 for easy access to address book contacts. One feature of the address book functionality may be a "rolling match" search; as the user enters a search into the search window, a list of matching options will be displayed below the search entry that are similar to the string of characters being typed. When the user sees the name of the contact to be called, he or she can highlight the desired contact with the mouse (not shown) or with the arrow keys on the keyboard 12 and press the "Enter" button to cause the number to be dialed.

The preferred keyboard 12 may also include a number of "request-for-call" buttons. The request-for-call buttons provide the ability to quickly request a call (for example, to the user's telephone 5) from various identified support providers, through functionality provided by the telecommunications management software 13. For example, as shown in FIG. 2, the preferred keyboard 12 may include an "automated-voice system" button 32 as part of the dedicated telephone control input devices 15. Button 32 may include the label "auto voice system" or some other label that indicates its association with the function (provided by the telecommunications management software 13) that allows the user to be placed in communication with (e.g., receive a call on telephone 5) an automated-voice system that provides information about the telecommunications management software 13 and/or system 10. For example, the user may access this feature to receive help with using other features of the telecommunications management software 13 or to receive information about system upgrades and/or new products.

Also a shown in FIG. 2, the preferred keyboard 12 may also include a "directory services" button 34 and a "technical support" button 36 as part of the dedicated telephone control input devices 15. Button 34 may include the label "directory services" or "directory" or some other label that indicates its association with the function (provided by the telecommunications management software 13) that allows a user to receive a call (e.g., on telephone 5) from a directory services provider when the directory services button 34 is pressed. Button 36 may include the label "technical support" or "tech support" or some other label that indicates its association with the function (provided by the telecommunications management software 13) that allows a user to receive a call (e.g., on telephone 5) from a technical/customer support representative when the technical support button 36 is pressed. The directory services button 34 and technical support button 36 thus provide quick access to directory services requests and technical support for assistance and troubleshooting problems occurring with the telecommunications management software 13 and/or system 10, respectively.

The preferred keyboard 12 may also include a "contacts browser" scrolling wheel 38 as part of the dedicated telephone control input devices 15. Scrolling wheel 38 may include a label indicating it is usable in conjunction with functionality provided by telecommunications management software 13 to allows the user to browse through address book contacts and to highlight the desired contact (for example, for speed dialing a telephone call). The contacts browser scrolling wheel 38 may be used in combination with the address book button 30, whereby the address book button 30 is pressed (to launch the address book function of the software 13) and thereafter the contacts browser scrolling wheel 38 is used to browse a list of contacts displayed by the address book until the desired contact is highlighted. Thereafter the user may press, for example, the keyboard "Enter" button to speed dial the highlighted number.

Figure 3:
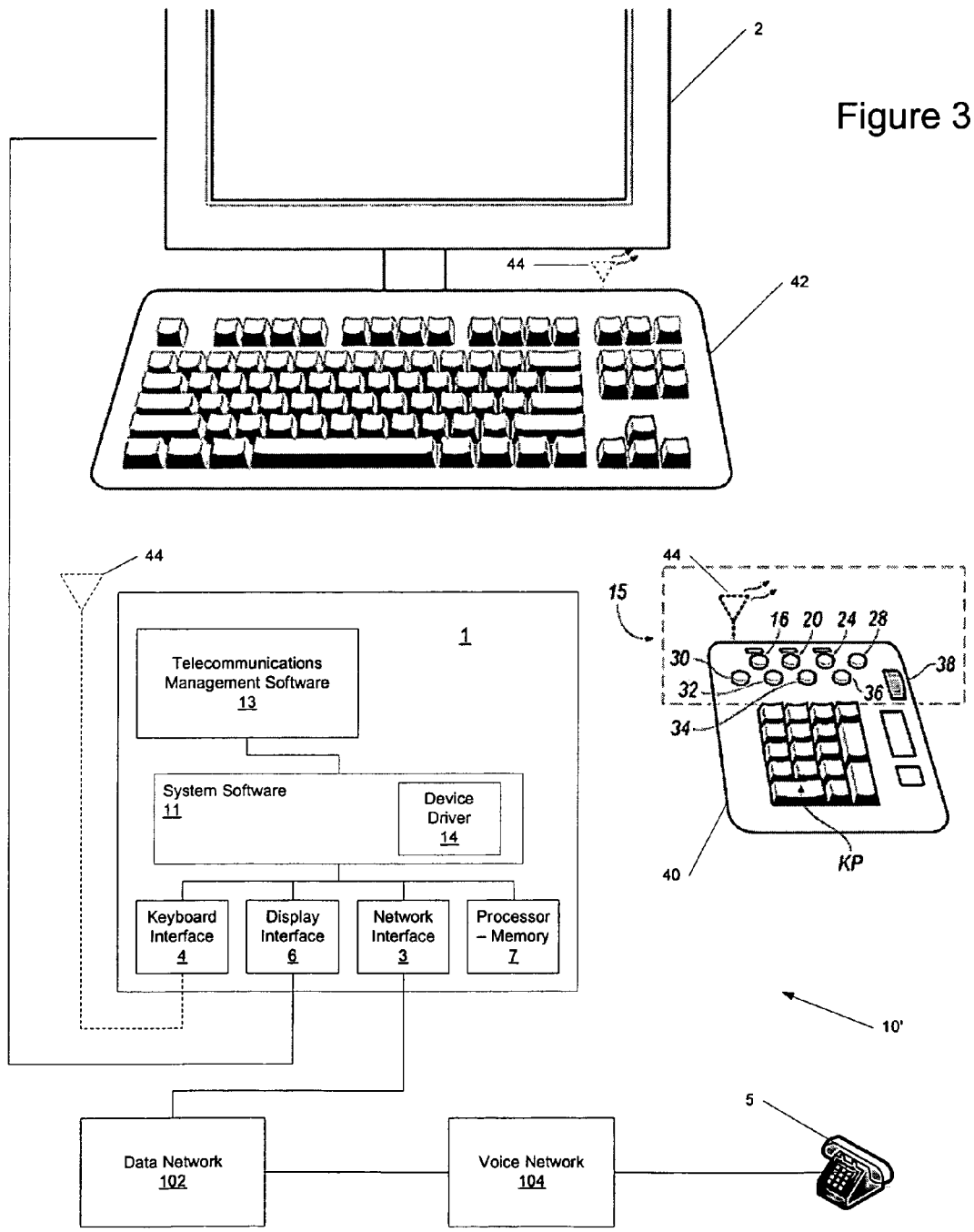
FIG. 3 is a view similar to FIG. 1 but shows an alternative embodiment of the computer keyboard system also implemented according to the present invention.

FIG. 3 illustrates an alternative system 10'. As illustrated, the alternative system 10' includes a keypad module 40 which is selectively detachable from keyboard module 42. Keypad module 40 includes the dedicated telephone control input devices 15, and may also include numeric keypad KP (which may be useful for entering numeric information, such as speed dial information or telephone numbers). Keyboard module 42 retains the standard generic (e.g., QWERTY) pushbutton keys. In this fashion, the user may place the dedicated telephone control input devices 15 at a convenient location remote from the keyboard module (for example, closer to telephone 5). The alternative system 10' may be implemented using wireless technology (for example, Bluetooth technology) to provide interfacing between keyboard module 42, computing device 1 and/or keypad module 40. For example, keyboard module 42 may be communicatively connected to computing device 1 via a universal serial bus (USB) connection, while keypad module 40 may be communicatively connected to keyboard module 42 via a wireless connection using transceivers 44. Alternately, keyboard 42 and keypad module 40 may be communicatively connected to computing device 1 via a wireless connection among transceivers 44.

Figure 4:
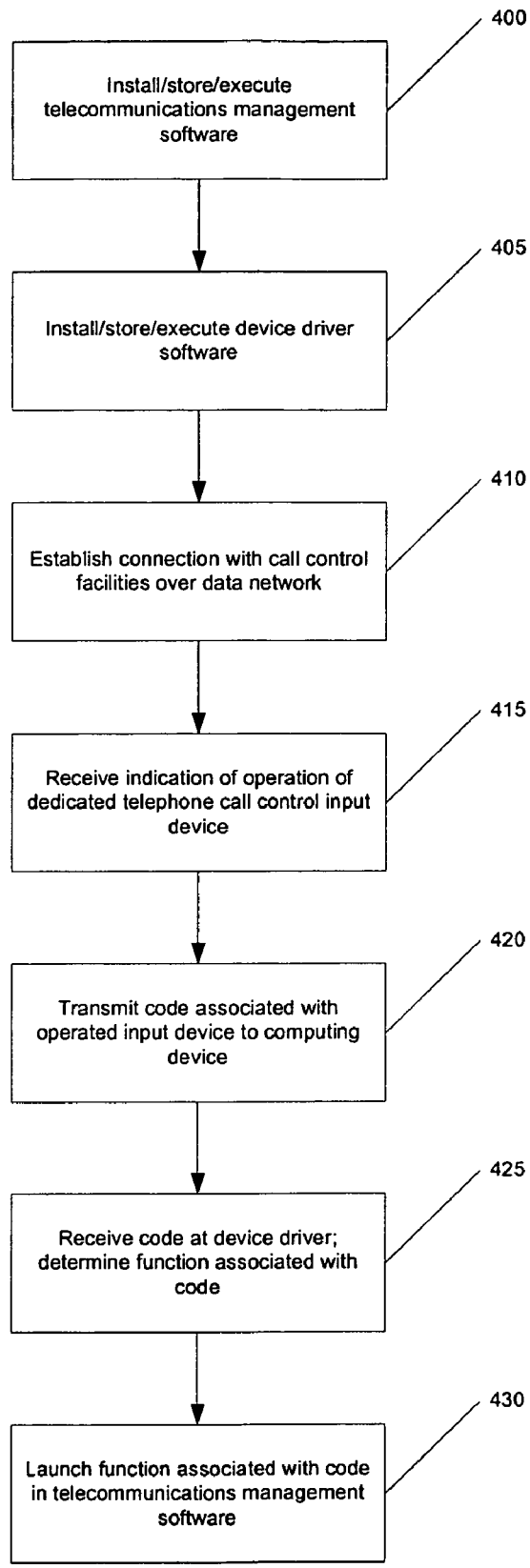
FIG. 4 is a process flow diagram illustrating an example method of implementing and using the embodiments of FIGS. 1 and 2, according to the present invention.

An example method of using the preferred system 10 (or system 10') to access and control telephone features is illustrated in FIG. 4. Initially, telecommunications management software 13 may be installed, stored and executed on computing device 1 (step 400), wherein the software 13 is adapted to provide for access and control of telephone features via the connection to call control facility 106. The telecommunications management software 13 used with embodiments of the system 10 may be the IOBI client software offered by Verizon. Such installation may be from a storage media (such as an optical disk) or over network interface 3 from a remote storage location. Storage within computing device 1 may be in the memory system 7 within such computing device 1. Execution of the software 13 may be by the processor system 7 within such computing device 1.

Device driver software 14 may be installed, stored and executed (step 405) by the computing device 1. The device driver software may be installed from a storage media or over network interface 3 from a remote storage location, may be stored in the processor/memory system 7 of the computing device 1, and may be executed by the processor/memory system 7 of computing device 1. Device driver software 14 may perform an initialization routine to initialize the dedicated telephone control input devices 15, such as setting the status of indicator lights and mapping the codes associated with each input device with appropriate functions supported by telecommunications management software 13.

Telecommunications management software 13 may establish a connection over the data network with call control facility 106 (step 410). Software 13 may send access control information (such as user ID and password information) to call control facility 106 in order to establish the connection. Upon establishing a connection, software 13 may obtain status and/or profile information associated with the condition of the connection between telephone 5 and voice network 104. For example, software 13 may obtain from call service center 106 a list of recent calls, call forwarding settings, address book contact information, preference information specific to the user, and other information.

A user of the system 10 may then select one of the specifically designated telephone control input devices to access a service provided by the telephony management software 13 (step 415). In this example, the user depresses the "address book" button 30. The selection—in this example, the depression of button 30—causes the code corresponding to button 30 to be transmitted over the communication path between keyboard 12 and computing device 1 (step 420) and received by device driver software 14 (step 425). Device driver software 14 determines the associated function corresponding to the code received, and launches the associated function in the telecommunications management software 13 (step 430). The function may then cause various communications between the telecommunications management software 13 and call control facility 106 over data network 102 (step 435) in order to achieve the desired action. For example, in the case of the address book button 30, the telecommunications management software 13 may request the contacts information stored by the user in service center database 108. As another example, if the "call forwarding" button were selected, the software 13 may send a message to the call control facility 106 requesting that call forwarding to a particular number be set in the voice network. The call control facility 106 may the respond with a message indicating the success/failure of such request. Further selections of other input devices 15 may cause similar actions.

In the preceding specification, the various preferred embodiments according to the present invention(s) have been described. It will, however, be evident that various modifications and changes may be made to such embodiments without departing from the broader spirit and scope of the invention(s)

as set forth in the claims that follow. The specification and drawings are accordingly to be regarded in an illustrative rather than restrictive sense, and the full scope of the present invention(s) shall be according to the claims attached hereto.

What is claimed is:

1. A system comprising:
a computing device connected to a first network, the computing device configured to execute telecommunications management software;
a telephone connected to a second network;
a call control facility configured to receive a command corresponding to a telephone control function from the computing device via the first network, and further configured to manage telephony services with the telephone via the second network in response to the received command;
a keyboard including an interface to the computing device, a plurality of generic use input devices, and a plurality of dedicated telephone control input devices, each dedicated telephone control input device corresponding to one of a plurality of telephone control functions provided through the telecommunications management software; and
a device driver stored and executed by the computing device to detect operation of one of the plurality of dedicated telephone control input devices and allow the corresponding one of the plurality of telephone control functions provided through the telecommunications management software to be initiated in response to said operation, the telecommunications management software being configured to send a command via the first network to the call control facility, the command corresponding to the telephone control function.

2. The system of claim 1, wherein the plurality of dedicated telephone control input devices include at least one pushbutton.

3. The system of claim 1, wherein the plurality of dedicated telephone control input devices include a start button for initiating activation and control of said telephone features by operation of the computer and said computer keyboard after said start button is pressed and held for a predetermined period of time.

4. The system of claim 1, wherein said dedicated telephone control input devices include a call forwarding button, and wherein the device driver is configured to receive a code associated with the call forwarding button from the keyboard upon operation of the call forwarding button, and to activate a call forwarding function of the telecommunications management software in response to receiving said code.

5. The system of claim 4, wherein said keyboard further includes a first indicator light proximate to said call forwarding button, and wherein the device driver is configured to provide a signal to the keyboard to control the first indicator light based on whether the call forwarding function is activated.

6. The system of claim 1, wherein said dedicated telephone control input devices include a voicemail button, and wherein the device driver is configured to receive a code associated with the voicemail button from the keyboard upon operation of the voicemail button, and to initiate a voicemail function of the telecommunications management software in response to receiving said code.

7. The system of claim 6, wherein said keyboard further includes a second indicator light proximate to said voicemail button, and wherein the device driver is configured to provide a signal to the keyboard to control the second indicator light based on whether voicemail is detected by the telecommunications management software.

8. The system of claim 1, wherein said dedicated telephone control input devices include a busy button, and wherein the device driver is configured to receive a code associated with the busy button from the keyboard upon operation of the busy button, and to initiate a call redirection function of the telecommunications management software in response to receiving said code.

9. The system of claim 8, wherein said keyboard further includes a third indicator light proximate to said busy button, and wherein the device driver is configured to provide a signal to the keyboard to control the third indicator light based on whether the call redirection function is activated.

10. The system of claim 1, wherein said dedicated telephone control input devices include an address book button, and wherein the device driver is configured to receive a code associated with the address book button from the keyboard upon operation of the address book button, and to initiate an address book function of the telecommunications management software in response to receiving said code.

11. The system of claim 1, wherein said dedicated telephone control input devices include at least one request-for-call button, and wherein the device driver is configured to receive a code associated with the at least one request-for-call button from the keyboard upon operation of the at least one request-for-call button, and to initiate a request for call function of the telecommunications management software in response to receiving said code.

12. The system of claim 1, wherein said dedicated telephone control input devices include a directory services button, and wherein the device driver is configured to receive a code associated with the directory services button from the keyboard upon operation of the directory services button, and to initiate a request for directory services call function of the telecommunications management software in response to receiving said code.

13. The system of claim 1, wherein said dedicated telephone control input devices include a technical support button, and wherein the device driver is configured to receive a code associated with the technical support button from the keyboard upon operation of the technical support button, and to initiate a request for technical support call function of the telecommunications management software in response to receiving said code.

14. The system of claim 1, wherein said dedicated telephone control input devices include a contacts scrolling wheel.

15. The system of claim 1, wherein the first network is a packet switched network and the second network is a public switched telephone network.

16. The system of claim 1, the telecommunications management software being further configured to obtain information associated with the telephone from the call control facility, the information including at least one of a list of recent calls, call forwarding settings, and address book contact information.

17. A system comprising:
a computing device connected to a first network, the computing device configured to execute telecommunications management software;
a telephone connected to a second network;
a call control facility configured to receive a command corresponding to a telephone control function from the computing device via the first network, and further configured to manage telephony services with the telephone via the second network in response to the received command;

a keyboard system separate from the telephone and including an interface to the computing device, and a plurality of dedicated telephone control input devices, each dedicated telephone control input device corresponding to one of a plurality of telephone control functions provided through the telecommunications management software, the telecommunications management software being further configured to detect operation of one of the plurality of dedicated telephone control input devices and send a command corresponding to the telephone control function to the call control facility.

18. The system of claim 17, wherein the interface to the computing device is a wireless interface.

19. The system of claim 17, wherein the first network is a packet switched network and the second network is a public switched telephone network.

20. The system of claim 17, the telecommunications management software being further configured to obtain information associated with the telephone from the call control facility, the information including at least one of a list of recent calls, call forwarding settings, and address book contact information.

21. A method comprising:

executing telecommunications management software on a computing device, the computing device including a keyboard interface to a keyboard having a plurality of dedicated telephone control input devices, and a network interface to a data network;

establishing a connection between the computing device and call control facilities of a telecommunication service provider over the data network, the call control facilities connected to a voice network and configured to manage telephony services with a telephone that is physically separate from the computing device and the keyboard, the telephone being connected to the voice network;

receiving an indication of operation of a selected input device of the plurality of dedicated telephone control input devices, the selected input device associated with a telephone action;

transmitting a code associated with the operation of the selected input device to the computing device over the keyboard interface;

determining a function of the telecommunications management software associated with the code;

activating the function in response to the determination, the function causing communication between the computing device and the call control facilities to implement the telephone action; and the call control facility implementing the telephone action.

22. The method of claim 21, wherein the telephone action is one of call forwarding, voicemail, busy redirection, request for call and accessing an address book.

23. The method of claim 21, further comprising:

transmitting the code over a wireless interface from a first module of the keyboard to a second module of the keyboard, the first module and second module being physically detached from each other.

24. The method of claim 21, wherein the data network is a packet switched network and the voice network is a public switched telephone network.

25. The method of claim 21, the telecommunications management software being further configured to obtain information associated with the telephone from the call control facility, the information including at least one of a list of recent calls, call forwarding settings, and address book contact information.

* * * * *